W. A. WHITNEY.
UNIVERSAL JOINT.
APPLICATION FILED OCT. 9, 1919.
1,394,701. Patented Oct. 25, 1921.
2 SHEETS—SHEET 1.
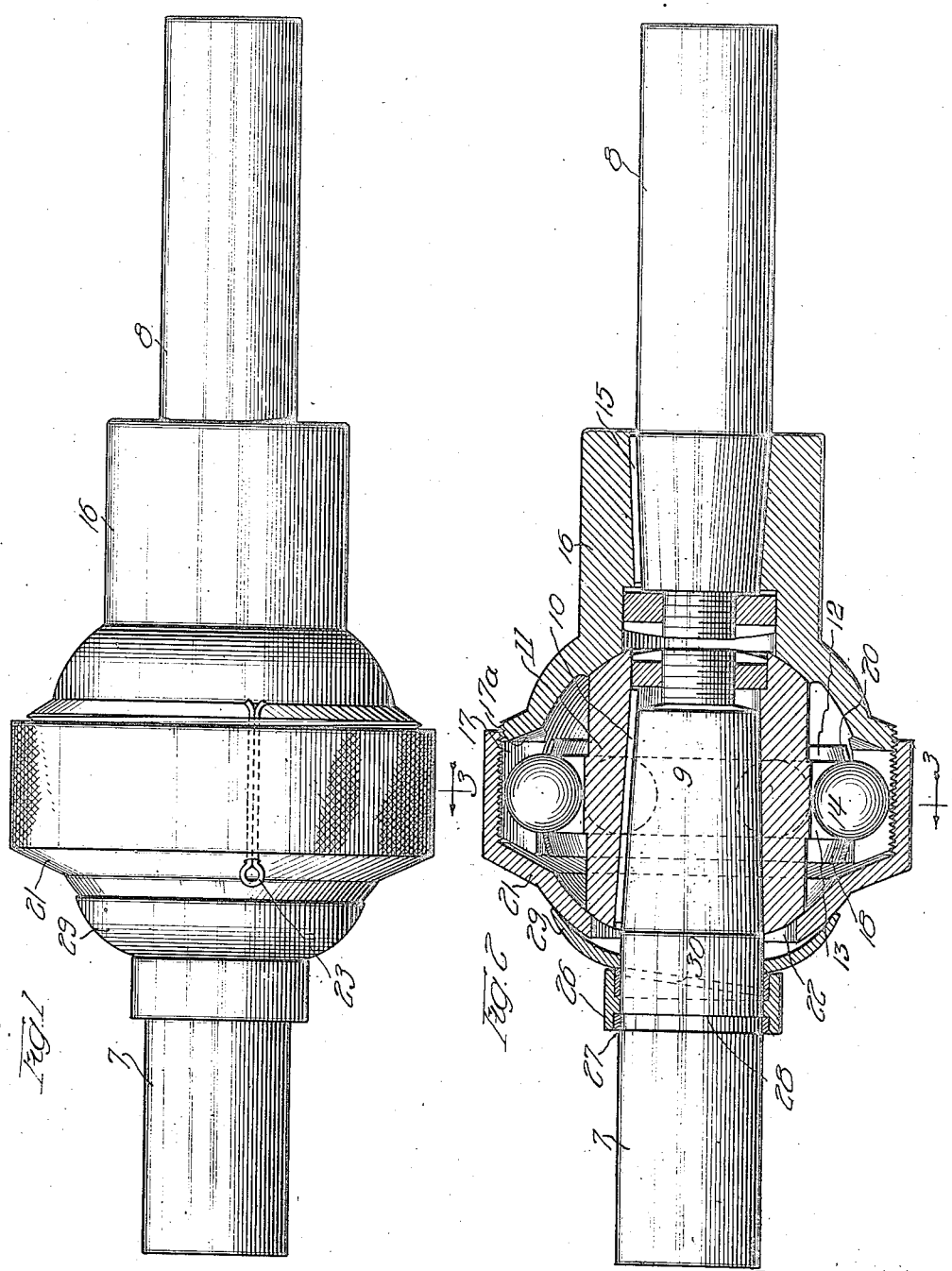

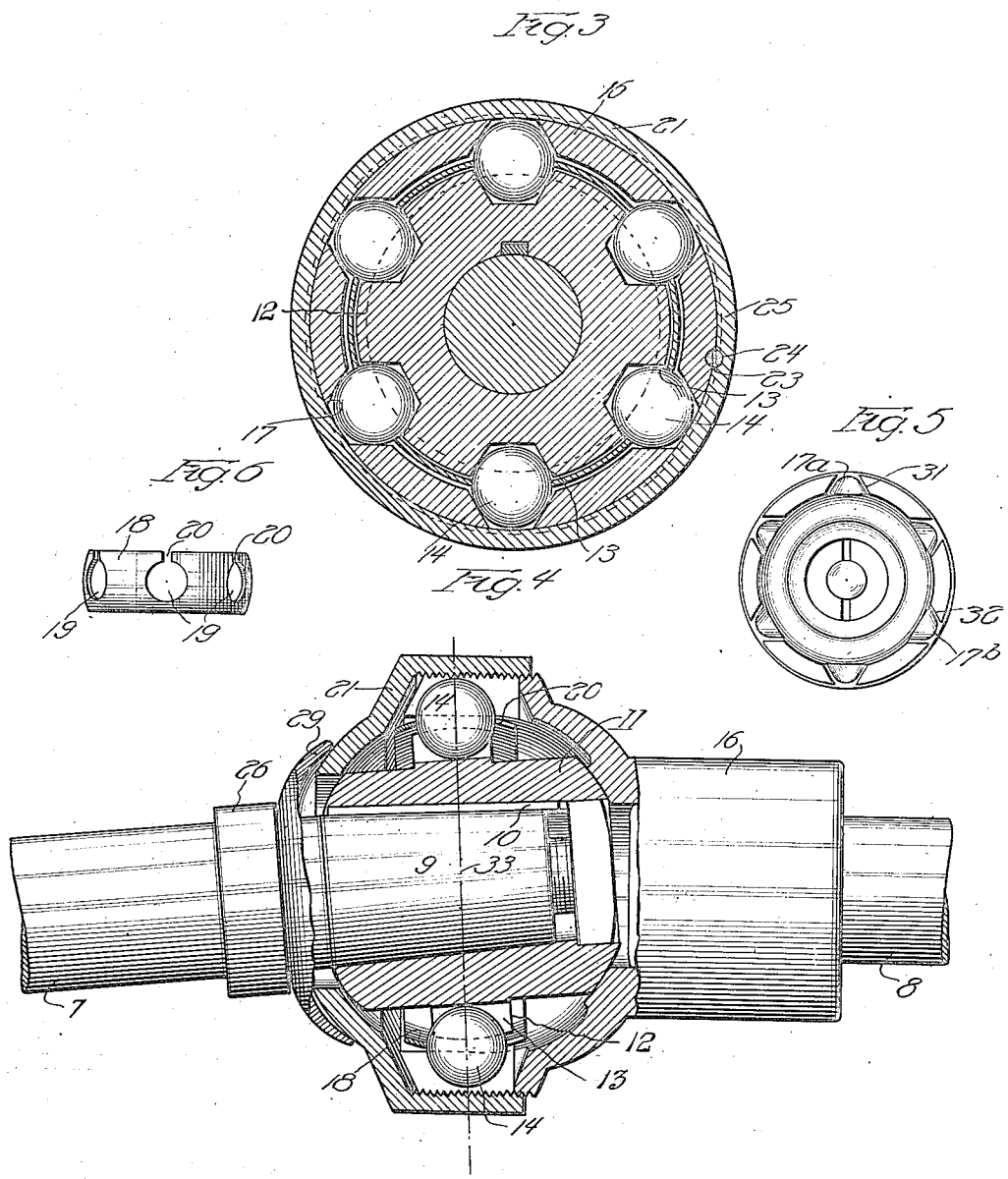

UNITED STATES PATENT OFFICE.

WILLIAM A. WHITNEY, OF ROCKFORD, ILLINOIS, ASSIGNOR TO TOWNER K. WEBSTER, OF EVANSTON, ILLINOIS.

UNIVERSAL JOINT.

1,394,701.   Specification of Letters Patent.   Patented Oct. 25, 1921.

Application filed October 9, 1919. Serial No. 329,434.

*To all whom it may concern:*

Be it known that I, WILLIAM A. WHITNEY, a citizen of the United States, residing at Rockford, in the county of Winnebago and State of Illinois, have invented a certain new and useful Improvement in Universal Joints, of which the following is a full, clear, concise, and exact description, reference being had to the accompanying drawings, forming a part of this specification.

My invention relates to universal joints for connecting driving and driven shafts and has for its general object the provision of an efficient universal joint which can be manufactured economically.

A further object of the invention resides in the provision of a universal joint in which the driving and driven elements are interconnected by means of anti-friction balls and in which lost motion between the driving and driven elements is reduced to a minimum. Another object is the provision of an efficient universal joint in which the driving stress is equally distributed to the driven element at several points, and in which the driving stress may be applied to the driven element at any desired number of points spaced around the axis of the driven element.

The provision of a universal joint accomplishing these objects has heretofore been attempted, and at best the result was either a joint which jammed, which had too much lost motion for efficiency, or which was prohibitive due to is excessive manufacturing cost.

The universal joint of my invention accomplishes the objects stated, and is such that it can be manufactured economically. These and other objects will be pointed out in connection with the accompanying drawings, wherein—

Figure 1 is an elevational view of the universal joint of my invenion;

Fig. 2 is a vertical cross sectional view of Fig. 1;

Fig. 3 is a transverse cross sectional view taken along the line 3—3 of Fig. 2, looking in the direction indicated by the arrows;

Fig. 4 is a view similar to Fig. 2, showing the driving and driven shafts out of alinement.

Fig. 5 is an end view of the socket member forming part of the driven element, this view being on a reduced scale; and Fig. 6 is a side elevational view of the ball retainer ring, this view being on a reduced scale.

Similar characters of reference refer to similar parts throughout the several views.

Referring first to Fig. 1, 7 and 8 designate two shafts, either of which, so far as the universal joint of my invention is concerned, may be considered as the driving shaft, but for the sake of this description I shall refer to the shaft 7 as the driving element and the shaft 8 as the driven element.

The inner end of the driving shaft 7 is tapered as shown at 9 and has its tapered portion provided with a keyway for the reception of the key shown at 10. Secured to the driving shaft 7 by means of the key 10 is a spherical head or ball member 11 provided with a centrally located annular flange 12. This flange contains any desired number of transverse grooves 13, 13, arranged for the reception of anti-friction balls shown at 14, 14. Although any desired number of grooves 13 and anti-friction balls 14 may be employed, I have found that six anti-friction balls produce a very efficient universal joint, and have accordingly shown the joint as provided with six coöperating grooves and balls 13 and 14. The walls of the several grooves 13, 13 converge inwardly as most clearly shown in Fig. 3 and are of a depth such that the balls do not rest upon the bottoms of the grooves.

Disposed around the ball member 11 and attached to the driven shaft 8 by means of a key 15 is a socket member 16 containing a plurality of slots 17, 17, each of which is disposed opposite one of the grooves 13 provided in the ball member.

The walls of the slots 17, 17 converge outwardly as most clearly shown in Fig. 3, and coöperate with the grooves 13 of the ball member and the balls 14 for providing a driving connection between the ball and socket members.

Extending around the flange 12 carried by the ball member 11 is a spherical ball retainer ring 18 provided with six apertures 19, 19, in which the several balls 14, 14, are disposed. The size of the opening 19 is such that the balls 14 have substantially no transverse or longitudinal movement relatively to the ball retainer ring. This ring is preferably slotted at 20, 20, so that it may be assembled upon the spherical shaped periphery of the flange 12.

Screwed to the socket member 16 and forming the second half of the socket is a cap 21 provided with a comparatively large sized opening 22 through which the driving shaft 7 extends. The cap 21 may be locked to the socket 16 by any suitable mechanism, as, for example, by a cotter pin, as shown at 23. This cotter pin extends through registering grooves 24 and 25 formed respectively in the cap 21 and socket 16.

Mounted on the driving shaft 7 is a ring 26 held in place by a locking ring 27 fitting in a groove 28 provided in the driving shaft. Interposed between the ring 26 and the cap 21 is a collar 29 normally held against the cap 21 by a spring 30 interposed between the collar 29 and ring 26. The collar 29 serves the function of sealing the opening 22 and prevents dirt and dust from entering the socket formed by the members 16 and 21.

Attention is directed to the fact that the walls of the grooves 13, 13, as well as the bottoms thereof, lie in planes which are parallel to the axis of the driving shaft 7, as distinguished from the curved walls disclosed in my early application, which resulted in Patent No. 1,022,909, dated April 9, 1912. Similarly the walls of the slots 17, 17 provided in the socket member are perfectly straight walls, and lie in planes which are parallel to the axis of the driven shaft 8. This straight wall groove arrangement results in a universal joint which can be manufactured very economically. It will be observed that the flange 12 extends beyond the base of the ball member 11 and thereby readily permits the milling of the several grooves 13. Similarly the several slots 17 formed in the socket member 16 can be milled very easily by passing the milling cutter transversely across the socket member. To facilitate the provision of these slots, the wall 31 of the slot 17$^a$, as shown in Fig. 5, and the wall 32 of the slot 17$^b$ may be milled in one operation. The formation of the corresponding walls of the other slots in the socket member may be accomplished in the same manner.

In Fig. 4 I have shown the two shafts 7 and 8 out of alinement and the position that the anti-friction balls 14, 14 and the ball retainer ring 18 assume when the shafts 7 and 8 are moved to the position shown. When the shafts 7 and 8 are thus moved out of alinement the center line which I have shown at 33 and which passes through the centers of the several balls 14, 14 does not lie in a plane at right angles to the axis of the driving shaft 7. The upper end of the center line here shown is inclined slightly to the right of a plane passing through the center of the ball member 11 and disposed at right angles to the axis of the shaft 7, with the result that when the shaft 7 is moved to the position shown in Fig. 4, the two balls shown in this figure are moved slightly outwardly and thereby maintain the required snug engagement between the walls of the grooves 13 and the walls of the coöperating slots 17. By reason of the fact that the ball retainer ring 18 prevents relative longitudinal and transverse movement of the balls 14, a good six point driving connection is maintained between the ball and socket members at all times.

Having thus described my invention, what I claim and desire to secure by Letters Patent of the United States is:

1. A universal joint comprising coöperating ball and socket members provided with registering grooves, the walls of which form planes, and balls in said grooves forming a driving connection between the ball and socket members, one wall of each groove in the socket member being disposed in the same plane with a wall of another groove in the socket member.

2. A universal joint comprising coöperating ball and socket members provided with registering grooves, the grooves in each member lying in planes, parallel to the axis of that member, and balls in said grooves forming a driving connection between the ball and socket members, one wall of each groove in the socket member being disposed in the same plane with a wall of another groove in the socket member.

3. A universal joint comprising coöperating ball and socket members provided with registering grooves in which the walls form planes, the walls of the grooves in the ball member converging inwardly and the walls of the grooves in the socket member converging outwardly and balls in said grooves forming a driving connection between the ball and socket members, one wall of each groove in the socket member being disposed in the same plane with a wall of another groove in the socket member.

4. A universal joint comprising coöperating ball and socket members provided with registering grooves, the axis of each groove forming a straight line and balls in said grooves forming a driving connection between the ball and socket members, one wall of each groove in the socket member being disposed in the same plane with a wall of another groove in the socket member.

5. A universal joint comprising coöperating ball and socket members provided with registering grooves, the walls of which form planes, balls in said grooves forming a driving connection between the ball and socket members and a retainer ring for the balls.

6. A universal joint comprising coöperating ball and socket members provided with registering grooves, the grooves in each member lying in planes parallel to the axis of that member, balls in said grooves forming a driving connection between the ball and socket members and a retainer ring for the balls.

7. A universal joint comprising a ball member, an annular flange projecting outwardly from the ball member, said flange being provided with grooves extending transversely therethrough, a socket member provided with grooves registering with the grooves in the ball member, and a plurality of balls in the grooves, forming a driving connection between the ball and socket members, the opposed walls of each groove in the socket member being in line with the walls of different grooves in opposite portions of the socket member.

8. A universal joint comprising a ball member, an annular flange projecting outwardly from the ball member, said flange being provided with grooves extending transversely therethrough, a socket member provided with slots extending transversely therethrough, and registering with the grooves in the ball member, balls in the grooves and slots forming a driving connection between the ball and socket members, and a cap for the socket member extending over said slots, the opposed walls of each groove in the socket member being in line with the walls of different grooves in opposite portions of the socket member.

9. A universal joint comprising a ball member, an annular flange projecting outwardly from the ball member, said flange being provided with grooves extending transversely therethrough, the walls of the grooves forming planes and converging inwardly, a socket member provided with slots registering with said grooves, the walls of said slots forming planes converging outwardly, balls in said grooves and slots forming a driving connection between the ball and socket members and a cap for the socket member extending over said slots.

10. A universal joint comprising a ball member, an annular flange projecting outwardly from the ball member, said flange being provided with grooves extending transversely therethrough, the walls of the grooves forming planes and converging inwardly, a socket member provided with slots registering with said grooves, the walls of said slots forming planes converging outwardly, balls in said grooves and slots forming a driving connection between the ball and socket members and a ball retainer ring interposed between the ball and socket members.

11. A universal joint comprising driving and driven shafts, a ball member mounted on one of said shafts, a coöperating socket member mounted on the other of said shafts, registering grooves in the ball and socket members, balls in the grooves forming a driving connection between the ball and socket members, a collar mounted on the ball member shaft, and spring means interposed between the collar and shaft, tending to hold the collar against the said socket member, the opposed walls of each groove in the socket member being in line with the walls of different grooves in opposite portions of the socket member.

In witness whereof I hereunto subscribe my name this 23rd day of September, 1919.

WILLIAM A. WHITNEY.

Witnesses:
 ROBERT F. BRACKE,
 MARIE F. CROTTY.